(12) United States Patent
Schevardo et al.

(10) Patent No.: US 10,278,253 B2
(45) Date of Patent: Apr. 30, 2019

(54) PASSENGER CABIN HAVING ILLUMINATION ARRANGEMENT

(71) Applicant: DIEHL AEROSPACE GMBH, Ueberlingen (DE)

(72) Inventors: Dirk-Achim Schevardo, Roethenbach (DE); Till Kiewning, Winkelhaid (DE); Stefan Dobler, Neunkirchen am Brand (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 16/116,097

(22) Filed: Aug. 29, 2018

(65) Prior Publication Data

US 2019/0069369 A1 Feb. 28, 2019

(30) Foreign Application Priority Data

Aug. 30, 2017 (DE) .................. 10 2017 008 136

(51) Int. Cl.
*H05B 33/08* (2006.01)
*H05B 37/02* (2006.01)
*B64D 11/00* (2006.01)

(52) U.S. Cl.
CPC ......... *H05B 33/0863* (2013.01); *B64D 11/00* (2013.01); *H05B 33/0845* (2013.01);
(Continued)

(58) Field of Classification Search
CPC ............... H05B 33/08; H05B 33/0863; H05B 33/0845; H05B 37/02; H05B 37/0254;
(Continued)

(56) References Cited

U.S. PATENT DOCUMENTS 5,677,603 A * 10/1997 Speirs .................... B64D 11/00
315/324
2011/0254445 A1 10/2011 Bachhuber
(Continued)

FOREIGN PATENT DOCUMENTS

DE 102005039651 A1 3/2007
DE 102010015518 A1 10/2011
(Continued)

*Primary Examiner* — Thai Pham
(74) *Attorney, Agent, or Firm* — Scully Scott Murphy and Presser

(57) ABSTRACT

An illumination arrangement of a passenger cabin for a passenger aircraft contains a control line with a connected lamp arrangement and operating unit having operating elements for selecting light scenarios of the lamp arrangement by transmitting dedicated control signals of the operating elements from the operating unit to the lamp arrangement via the control line, the lamp arrangement has a first decoder for allocating a sequence of control signals to a prescribed one of the light scenarios, the first decoder has a decoding instruction in a menu structure, the selection of menu elements of the menu structure is effected by the control signals, the illumination arrangement contains an add-on display which is connected to the control line, the add-on display contains a second decoder with the same decoding instruction, according to which a respectively received control signal is assigned a graphic representation of the menu element that is in each case currently selected by the control signals, the graphic representation which is in each case currently recognized is displayed on the add-on display.

10 Claims, 4 Drawing Sheets

Figure 1:
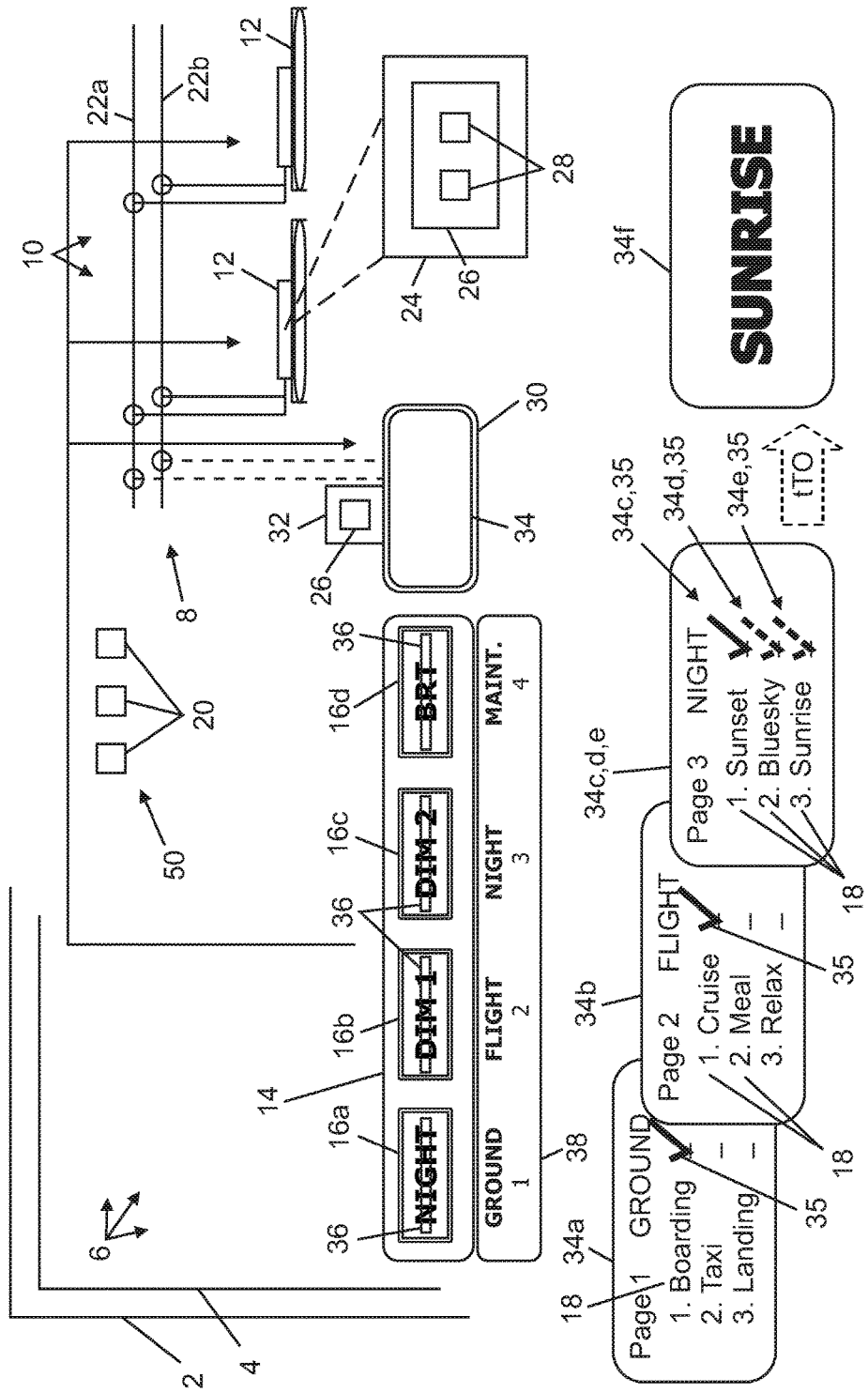

(52) U.S. Cl.
CPC ....... *H05B 37/029* (2013.01); *H05B 37/0254* (2013.01); *B64D 2011/0038* (2013.01); *B64D 2203/00* (2013.01)

(58) Field of Classification Search
CPC .................. H05B 37/029; B64D 11/00; B64D 2011/0038; B60Q 3/02
See application file for complete search history.

(56) References Cited

U.S. PATENT DOCUMENTS

| | | | |
|---|---|---|---|
| 2011/0309746 A1* | 12/2011 | Eckel | H05B 33/086 315/77 |
| 2015/0245449 A1 | 8/2015 | Chen et al. | |
| 2015/0245499 A1* | 8/2015 | Dautenhahn | H05K 3/341 228/37 |
| 2016/0262223 A1 | 9/2016 | Schevardo et al. | |

FOREIGN PATENT DOCUMENTS

| | | |
|---|---|---|
| DE | 102015002639 A1 | 9/2016 |
| DE | 102015010918 A1 | 2/2017 |

\* cited by examiner

PASSENGER CABIN HAVING ILLUMINATION ARRANGEMENT

BACKGROUND OF THE INVENTION

The invention relates to a passenger cabin for a passenger aircraft, having an illumination arrangement for the passenger cabin.

DISCUSSION OF THE PRIOR ART

In passenger aircraft with classic passenger cabins (classic cabins), fluorescent-tube-based, typically white illumination is used. A classic operating unit (classic FAP, flight attendant panel) can be used to switch the cabin illumination e.g. into the following states (light scenarios): "Off", "brightness 1", "brightness 2", "maximum brightness" (NIGHT, DIM1, DIM2, BRT(bright)). For single-colour illumination, this was entirely sufficient at that time. In a conventional classic cabin or operating unit, said light scenarios are selected in each case e.g. by simply pressing in each case a single operating key which is individually assigned to one of the light scenarios, which, in the above example, means there are four operating keys.

In the case of a retrofit/upgrade, aircraft with a classic cabin and single-colour illumination are to be converted to multi-colour illumination (e.g. using LED technology). This should be done using the available infrastructure, such as cabling and FAP (no change of hardware).

SUMMARY OF THE INVENTION

The present invention is directed to an improved passenger cabin. In accordance with the present invention, a passenger cabin contains an illumination arrangement for the passenger cabin. The illumination arrangement contains a control line and a lamp arrangement that is connected to the control line. The illumination arrangement contains an operating unit, which is likewise connected to the control line. The operating unit contains at least two operating elements. In particular, the operating element is an operating key or an operating switch or some other element. During operation of the illumination arrangement, the operating elements serve for selecting prescribed light scenarios, which—when selected—are to be produced by the lamp arrangement by emitting corresponding light. The selection is effected by transmitting control signals from the operating unit to the lamp arrangement via the control line. Each of the operating elements is here assigned its own individual control signal; i.e. the control signals which are produced by operating in each case one of the operating elements on the control line differ in pairs.

The lamp arrangement contains a first decoder. The first decoder assigns a prescribed respective one of the light scenarios that are to be produced by the lamp arrangement to a respective specific sequence of control signals which are received in succession. In other words, specific operating elements must be operated in the manner of a code in a specific order (that is to say the specific sequence)—in particular within a specific time, otherwise a time-out occurs—in order to select a specific light scenario and thus activate it. The lamp arrangement then produces, in accordance with a further assignment instruction (not explained in more detail), suitable light on the basis of the selected or activated light scenario in order to realize or implement said light scenario.

The first decoder here has a decoding instruction in the menu structure. The selection of menu elements of the menu structure is implemented by way of the control signals. The above-mentioned code is thus realized in the manner of the navigation of a menu structure. In other words, a respective operation of a respective one of the operating elements leads to the corresponding control signal and thereby in steps through various levels, selection alternatives, branches etc. and/or leads to the activation or deactivation of menu items, confirmation of a selection etc. The realization of a wide variety of known menu structures, operating modes etc. is possible here.

The illumination arrangement additionally contains an add-on display, which is likewise connected to the control line. The add-on display contains a second decoder. The second decoder contains the same decoding instruction as the first decoder, but additionally assigns a graphic representation of the menu element that is respectively currently selected by way of the control signals to a respectively received control signal. To this end, the second decoder has the same menu structure or knowledge of the menu structure of the first decoder. The graphic representation represents the respective current selection state in the menu structure in the form of an image and/or text. A graphic representation which is in each case currently recognized is displayed on the add-on display. Since the first and second decoders are connected to the control line, they both receive the same control signals and, due to the same menu structure, behave identically with respect thereto.

Via the graphic representation and the add-on display, an operator of the operating unit is therefore always currently informed about the current operating state within the menu structure in the lamp arrangement and in this way can deliberately and reliably navigate the menu structure, select desired menu items etc., in particular reach the desired light scenario via various levels and selection lists and select said light scenario and in this way activate the lamp arrangement to produce the light scenario reliably and without errors and using graphic feedback via the add-on display.

On the control line and possibly the cores thereof, in particular states of HI (for example 28 VDC) and LOW (for example 0 VDC) are possible. Here, in particular a maximum "keying rate" of approximately 300 ms (quickly pushing a key or another operating element) is possible.

The control line and the control signals which are transported thereon are in particular not in the form of a "data-bus" within the conventional meaning, on which binary or digital information is transported in the one-digit to 10-digit millisecond region or sub-millisecond region. Rather, operations of the operating elements are provided in each case as a binary static signal pattern in the rhythm of the operations of the elements (for example minimally 300 ms for signal changes, because elements are typically not operable more quickly by hand) as a control signal on the control line or the cores thereof (arbitrary number, typically two or three).

A passenger cabin within the meaning of the invention makes up the majority of a passenger aircraft. In particular, the passenger cabin includes the actual passenger seating and other common spaces, galley, toilets, entrance area, exit area and aisles for passengers and cabin crew. Substantially, merely the cockpit, cargo space and avionics spaces are not part of the passenger cabin.

Due to the connection to the control line, both decoders receive and process all the control signals that are applied to the control line; in colloquial terms, the second decoder consequently "listens" on the control line which control signals the first decoder receives and reconstructs—with knowledge of the decoding instruction—the current position of navigation within the menu structure or a selected and activated light scenario, with the result that this information can be displayed.

The illumination arrangement thus makes possible simple and intuitive control of the illumination produced or of the light in the passenger cabin. The operating unit can here be located, for example, in the passenger seating area, in a service area or in another section of the passenger cabin. The add-on display permits user guidance for the flight attendant during the operation of the classic FAP. It is possible with the invention to provide a multiplicity of different illumination scenarios in the passenger cabin in order to create an improved ambience for passengers by way of coloured illumination using several scenarios.

The actual light scenario (colour, brightness, transition characteristics) is stored in the respective lamps and is triggered or activated by the selection via the operating unit. A light scenario can here thus be in particular a colour and/or brightness progression over time. After activation by way of the operating unit, specific colour and/or brightness progressions are thus automatically traversed by the lamp or illumination arrangement, for example. For example, the activation of a light scenario "Bluesky" brings about a gradual colour transition from the currently selected colour to a predetermined shade of blue within 5 seconds. The activation of a scenario "Sunset" brings about a transition over 5 seconds and holding for 5 seconds of the colours orange, violet and red in each case. After 10 seconds of transition and holding of the colour blue, dimming for 15 seconds occurs.

The operating unit or the operating elements are here in particular part of a conventional FAP (flight attendant panel).

In particular, the add-on display is placed in a surrounding visual field, in particular next to the operating unit. That means that an operator of the operating unit during use of the latter is able to also see the add-on display at the same time.

In particular, an information element, for example in the form of a sticker, information sign or the like, is attached on, to or in the vicinity of the operating elements. The information element provides the allocation of the operating elements with respect to the menu navigation or menu control of the menu structure.

In particular, the add-on display is used only for a display of information, not control.

In a preferred embodiment, at least one of the representations contains a plain text identifier for at least one of the light scenarios. The plain text identifier is in particular a meaningful term for the corresponding light scenario, for example "Boarding", "Meal" or "Sunrise". Light scenarios that are to be selected or have been selected can thus be identified particularly easily and intuitively. The menu element is in particular a whole-area or screen-filling representation of the plain text identifier on the add-on display, which is indicated when the corresponding light scenario is activated and the operating unit is not operated.

In a preferred embodiment, the control line has two or three cores. Such a control line and the associated operating unit are already installed in a large number of aircraft having classic cabins. In accordance with the invention, it is possible hereby to particularly easily perform a retrofit or upgrade of an existing classic cabin into a passenger cabin in accordance with the invention.

In a preferred variant of this embodiment, each of the operating elements is assigned its own binary coding of the cores. In particular, four existing operating elements are assigned the respective binary coding 00,01,10,11 in the case of two cores and e.g. the respective binary coding "000,100,010,001" in the case of three cores. This is also an assignment instruction that is customary in practice, as a result of which the invention is able to be easily applied to existing passenger cabins in upgrade/retrofit.

In a preferred embodiment, the control signal is a digital control signal having a minimum pulse duration of 100 ms. The minimum pulse duration in particular is 200 ms or minimally 250 ms or minimally 300 ms or minimally 350 ms or minimally 400 ms. The corresponding pulse durations here correspond to the typically fastest possible manual operating switches between the two operating states "operated" or "not operated" of operating elements that operate in digital or binary fashion. This is also a dimensioning of control signals that is customary in practice, as a result of which the invention is able to be easily applied to existing passenger cabins or control lines in upgrade/retrofit.

In a preferred embodiment, the operating unit contains at most six, in particular five, in particular four, in particular three, in particular two operating elements for the light control. This is also a dimensioning of operating elements that is customary in practice, as a result of which the invention is able to be easily applied to existing passenger cabins or control lines in upgrade/retrofit.

The operating unit can in particular be part of an FAP, which can then contain, in addition to the operating elements for the light control, further operating and/or display elements, for example for cabin ventilation, cabin air conditioning etc.

In a preferred embodiment, the decoding instruction is established for two or three or four of the operating elements. Any other operating elements for the light control can then be allocated other functions which are not subject to the decoding instruction. Such functions can for example involve an emergency bright-light switching or deactivation of the cabin illumination or further special light scenarios.

In a preferred variant of this embodiment, in the case of two operating elements, they are assigned the functions "NEXT" (next menu item) and "SELECT", or, in the case of three operating elements, the functions "PAGE" (page select), "DOWN" (down on the page, alternatively "UP", "LEFT", "RIGHT", depending on the manner of navigation possible on the page), and "SCENE" (light scenario selection), or, in the case of four operating elements, the functions "GROUND", "FLIGHT", "NIGHT" and "MAINT." (maintenance). In this way, correspondingly differentiated and different operating concepts and menu structures can be realized for the respective number of elements. The above options should be understood to be examples. However, the specific designations and functions of the new functionalities of the operating elements can also establish any desired other menu structure.

In the first variant (two operating elements), in particular the following operating scheme ensues:

Starting point is the existence of an active light scenario, wherein none of the elements was operated within a preceding time-out time interval or duration (for example 10 seconds). By repeatedly operating the element NEXT, it is possible to display on the add-on display different representation pages which respectively include different groups of light scenarios, for example the representation pages for the groups "Ground", "Flight", "Night". Operating the element SELECT selects the currently displayed representation page and consequently group. By operating the element NEXT again, it is now possible to successively highlight individual light scenarios within the group, for example in the group "Night" the light scenarios "Sunset", "Bluesky" or "Sunrise". By operating the element SELECT, the highlighted light scenario is selected and output by the lamp arrangement. If no operating takes place during use for the time duration of the above-mentioned time-out, the active light scenario is maintained without change.

In the second variant (three operating elements), in particular the following operating scheme ensues:

As above, the starting point is the existence of an active light scenario. By repeatedly operating the element PAGE, the above-mentioned different representation pages can be displayed. As soon as the desired representation page is displayed, it is possible to successively highlight the above-mentioned light scenarios within the page by operating the element DOWN. By final operation of the element SCENE, the last-highlighted light scenario is selected and output by the lamp arrangement. If no operating takes place during use for the time duration of the above-mentioned time-out, the previously active light scenario is maintained without change.

In the third variant (four operating elements), in particular the following operating scheme ensues:

As above, the starting point is the existence of an active light scenario. By operating the element GROUND or FLIGHT or NIGHT or MAINT. once, the operator immediately reaches the corresponding representation page, wherein the uppermost light scenario of the representation page is highlighted. By repeated operation of the same element, the respectively next light scenario is highlighted on the representation page. After the time-out time has elapsed, the last-highlighted light scenario is selected and output by the lamp arrangement. In order to return without change to the previously or currently active light scenario, on a representation page having n (for example three) selectable light scenarios, the corresponding operating element can be operated an n+1th time (for example a fourth time) and consequently none of the available light scenarios is marked or all of them are marked. After the time-out time has elapsed, the previously activated light scenario is kept unchanged.

In one preferred embodiment, the illumination arrangement contains an input unit, via which a desired light scenario is able to be selected according to the menu structure. The illumination arrangement, in particular the add-on display, also contains a coding unit. The coding unit allocates the respective associated sequence of control signals to a selected light scenario in accordance with the inverse decoding instruction. The illumination arrangement, in particular the add-on display, also contains a sequencing unit. The latter transmits the respective sequence of the control signals to the illumination arrangement via the control line.

Input unit and/or coding unit and/or sequencing unit can in particular also be directly contained in the add-on display.

The input possibilities for an operator are therefore not bound to the limited possibilities of the operating unit or of the operating elements. The input unit can have any desired design, for example in the form of a voice input unit and/or a key unit having a multiplicity of keys and/or sliders etc. Desired light scenarios can be selected particularly easily and individually in this way. The coding unit then assumes the generation (inversely to the first decoder) of a series of virtual operations of the operating elements of the operating unit, which is understood by the first decoder in the lamp arrangement for realizing the corresponding light scenario. The sequence of virtual operations is then applied to the control line by the sequencing unit as a sequence of control signals and transmitted to the illumination arrangement.

In other words, the add-on display simulates virtual operation of the operating elements for operating the menu structure in the first decoder in order to activate a desired light scenario. The actual selection of the light scenario, however, takes place via the input unit, which is independent of the menu structure, in the add-on display. Nevertheless, the selection of the desired light scenario via the real operation of the operating elements remains as a parallel option.

Such an add-on display with input unit can be mounted in particular at any desired location in the passenger cabin, not necessarily within visual or physical range of the operating unit, in particular a conventional FAP. After all, the add-on display with input unit is a completely independent unit for operating the light scenarios, which does not require the operating unit.

In a preferred variant of this embodiment, the add-on display is part of a touch display or is embodied overall as a touch display, and the input unit is a touch unit of the touch display. The display via the add-on display and the input via the input unit are thus combined in one touch display, which makes possible a particularly simple and intuitive operation of the illumination arrangement or selection and activation of light scenarios. In particular, the coding unit and/or the sequencing unit are also part of the touch display or integrated as a structural touch display unit. In this way, only this unit needs to be attached at a desired location in the passenger cabin and be connected to the control line via a two-core or three-core connecting line.

The present invention is also directed to an aircraft containing the passenger cabin according to the invention. The aircraft and at least some of the embodiments thereof and the respective advantages already have been explained analogously in connection with the passenger cabin according to the invention.

The invention is based on the following findings, observations or considerations and also includes the following embodiments. The embodiments are here also referred to as "the invention", partly for the purposes of simplification. The embodiments can here also contain parts or combinations of the above-stated embodiments or correspond to them and/or possibly also include embodiments which have not yet been mentioned.

The invention is based on the observation that, as part of a retrofit/upgrade of a classic cabin to multicolour illumination, generally multicolour light scenarios (for example to simulate a sunrise) are desired. The hitherto available, e.g. four, states (for four operating elements on the classic FAP) significantly limit the scenario choice and consequently the available possibilities of modern LED illumination, specifically e.g. to four scenarios.

An upgrade of the discrete control system to a bus-based control system (as in state-of-the-art aircraft cabins) requires a highly complicated change of the cabin infrastructure (cabling, energy supply etc.) and is therefore typically not performed by customers, in particular airlines.

A typical solution therefore is to continue to select only four scenarios using the available control system (FAP); alternatively, further scenarios are selectable by pushing a respective one of the four elements of the FAP multiple times.

The invention is based on the finding that this type of control (double/triple operation of an element) provides no feedback, which means there is a risk of incorrect scenario selection. This is highly confusing for flight attendants and is not accepted by customers, in particular airlines. In addition, in particular in the case of double-allocation of classic FAP operating elements, there is a lack of knowledge as to which of the light scenarios available with these (multiply allocated) elements is currently selected or activated.

For this reason, according to the invention, an add-on display is proposed: an additional display is installed (especially as a pure display without input function) in particular in the vicinity of the FAP. The display is connected to the discrete control of the cabin system (only for monitoring purposes, unidirectional) and interprets the FAP element selection identically to the cabin illumination (lamp arrangement). To select the scene (light scenario), it is necessary to "click through".

According to the invention, a re-allocation mark (additional sticker) is also proposed: e.g. a sticker in the vicinity of the FAP indicates the new element allocation.

According to the invention, a touch display is also proposed: an additional control ("touch") and indication display is installed at a desired location. The display is connected (parallel) to the discrete controller of the cabin system for control as before. The necessary operating element sequence for the scene selection of the lamps is no longer generated manually (as in the interpreter mode, see below, by way of a sequence of operations on the FAP elements), but by way of an internal logic (coding unit and sequencing unit) in the add-on display. The scene selection can then be done in a conventional manner (element sequence on the FAP) or by way of the touch display. In that case, "clicking through" is no longer necessary to select the scene, the sequence (of virtual element operations) is brought about via the touch display logic (coding unit and sequencing unit) and applied to the control line or lamp arrangement.

In accordance with the invention, an interpreter mode is also proposed: the illumination (lamp arrangement) interprets the signal triggered by the operating unit (FAP) to the same extent as the display and begins the selected scenario. Consequently, the aircraft infrastructure (cabling, control etc.) remains unchanged, and no additional complicated certification (with respect to energy, EMC, cabling etc.) is necessary.

According to the invention, there are the following possibilities on a four-operating-element FAP for being able to select a plurality of scenarios:
- four elements+add-on display
- three elements+add-on display
- two elements+add-on display
- touch display With the system according to the invention, the existing infrastructure of the aircraft is used. The result is minor retrofitting outlay, no costs with respect to installation/demounting of a complicated control system, little certification outlay, any desired number of scenarios, and unique, simple representation for a selected and current scenario.

According to the invention, the result is an expansion of the available cabin control/infrastructure by new interpretation of the existing control. The result is an expansion of the classic aircraft cabin light control by FAP interpretation.

In summary, the invention is based on the finding that until now, the light scenarios in aircraft having classic cabins have been actuated by way of four operating elements for selecting four static states (OFF, DIM1, DIM2, BRIGHT). For modern cabin illuminations, four states are not sufficient. The invention demonstrates how the available control can be expanded by interpretation or overriding of the operating elements, display and interpreter mode of the lamp.

The invention serves for actuating light scenarios for an aircraft cabin.

BRIEF DECRIPTION OF THE DRAWINGS

Figure 2:
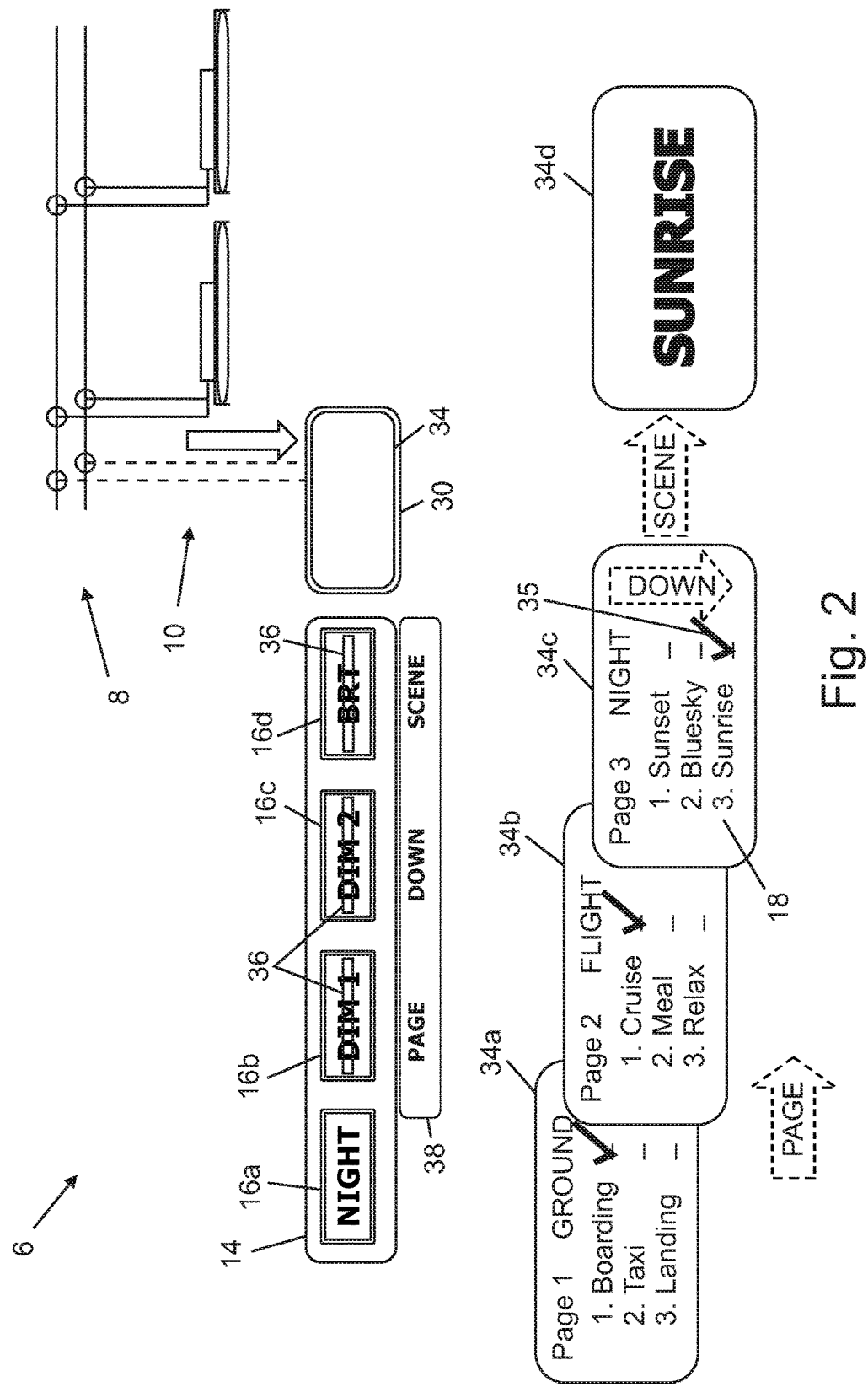
Figure 3:
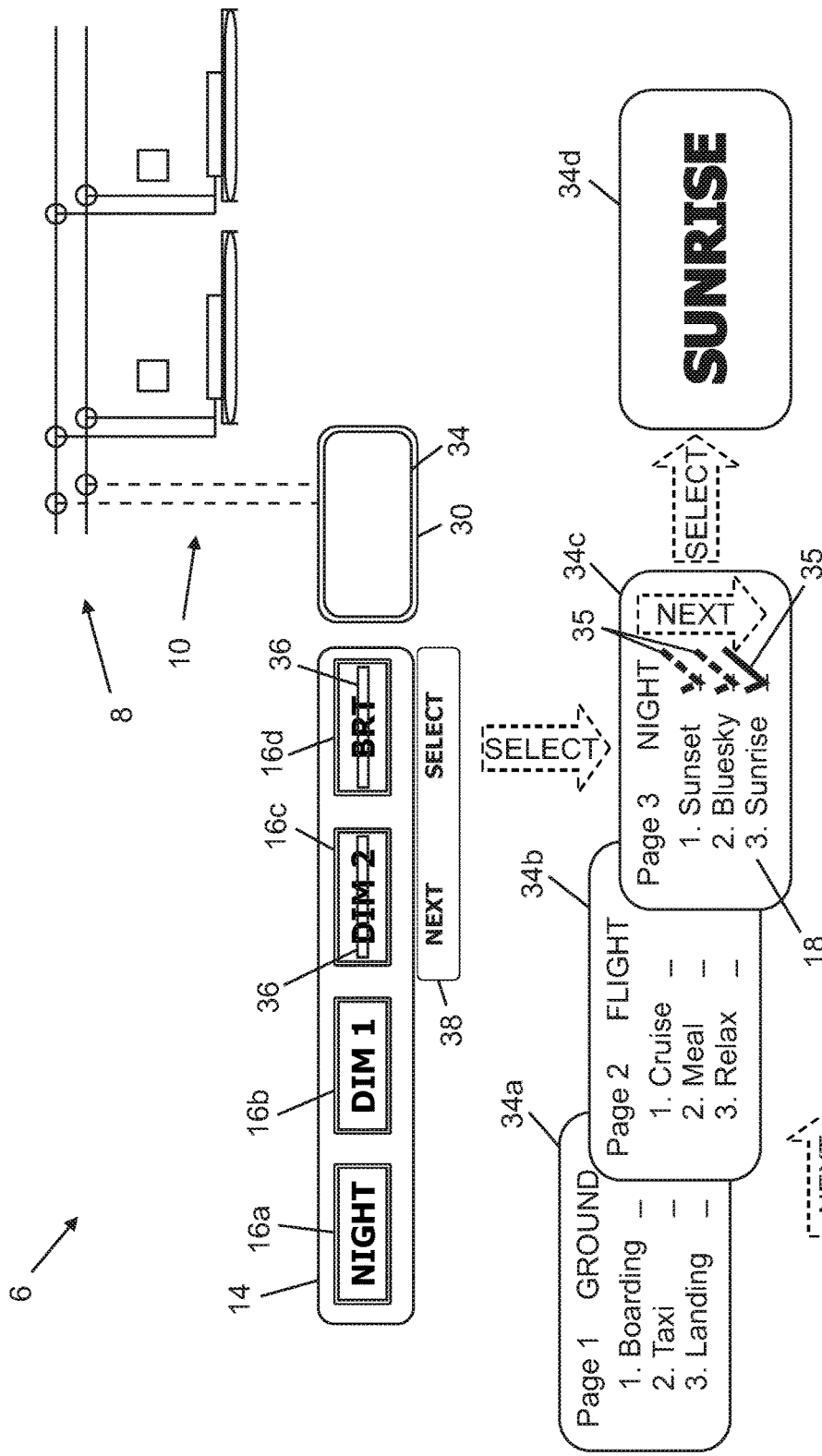
Figure 4:
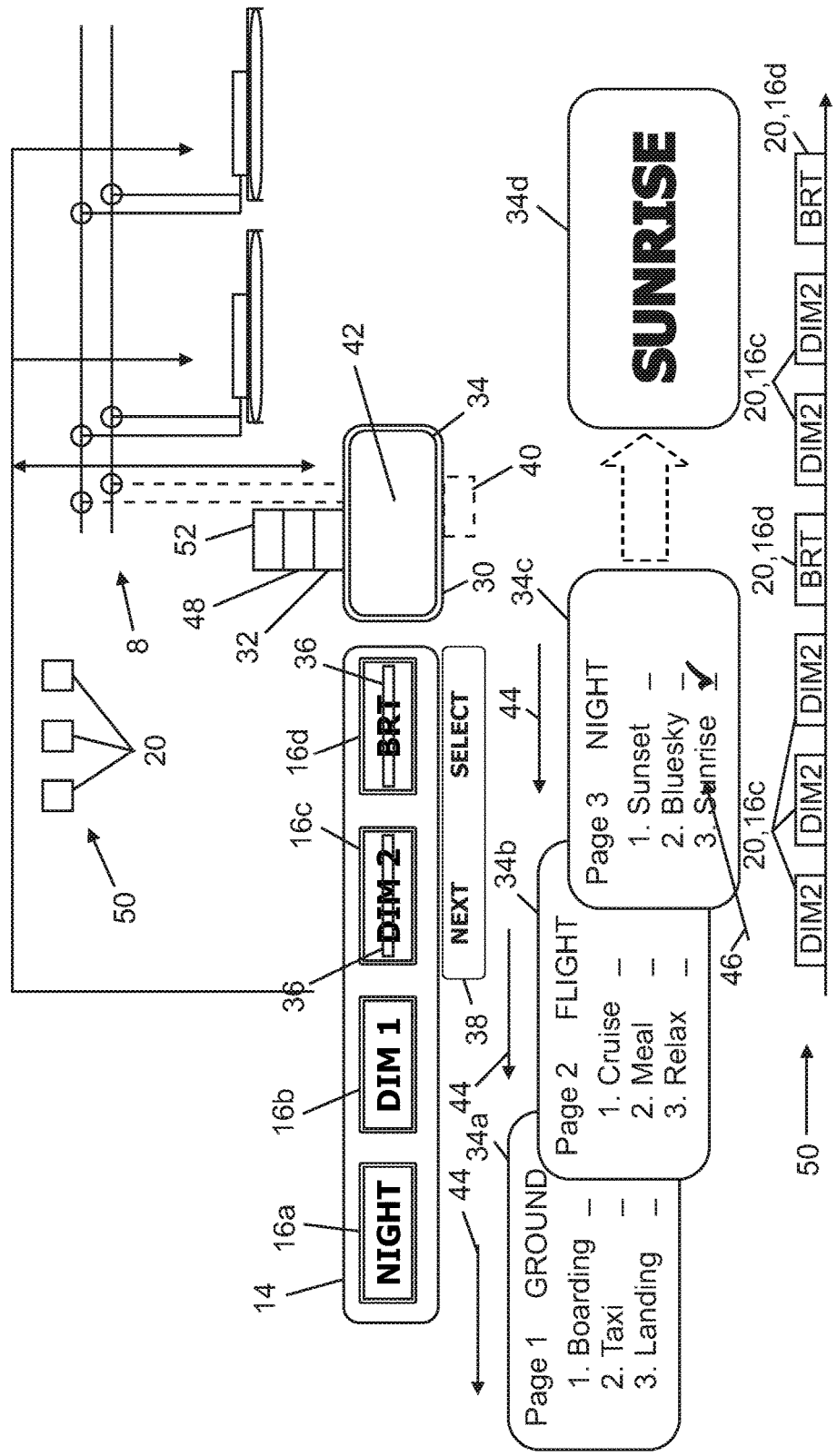

Further features, effects and advantages of the invention can be gathered from the following description of a preferred exemplary embodiment of the invention and the appended figures. Here, in a schematic diagram:

FIG. 1 shows a passenger aircraft having a passenger cabin according to the invention with four-key operation, FIG. 2 shows the situation from FIG. 1 with three-key operation, FIG. 3 shows the situation from FIG. 1 with two-key operation, FIG. 4 shows the situation from FIG. 3 with additional touch-pad functionality.

DETAILED DESCRIPTION OF THE DRAWINGS

FIG. 1 shows a detail from a symbolically indicated passenger aircraft 2 with a passenger cabin 4 which is likewise indicated symbolically. The passenger cabin 4 contains an illumination arrangement 6.

The illumination arrangement 6 contains a control line 8 and a lamp arrangement 10, here in the form of a plurality of LED multicolour lamps 12, only two of which are illustrated by way of example in FIG. 1. The lamp arrangement 10 is connected to the control line 8. The illumination arrangement 6 contains an operating unit 14, in the present case a classic FAP (flight attendant panel), which is likewise connected to the control line 8. The operating unit 14 has four operating elements 16a-d, in the present case in the form of operating keys which, in their original form, i.e. in connection with a monochromatic white fluorescent-tube cabin illumination had the functionalities in accordance with their designation: night illumination (NIGHT), dimming level 1 (DIM1), dimming level 2 (DIM2) and full brightness (BRT). Consequently, these four light scenarios 18 existed, wherein each was activated by operating the corresponding operating element 16a-d. As part of a retrofit/upgrade of the aircraft 2, the monochromatic cabin illumination was replaced by a full-colour-ready LED illumination as the lamp arrangement 10. For better readability, the operating elements 16a-d below are designated concretely as "operating keys" and their operating as "push".

The operating keys 16a-d served both before and after the upgrade for selecting prescribed light scenarios 18 to be produced by the lamp arrangement 10. Before the upgrade, these were said four illumination or dimming states of the monochromatic white illumination. After the upgrade, a total of twelve light scenarios 18 are possible as an example, specifically in 4 groups (GROUND, FLIGHT, NIGHT, MAINT. (Maintenance)) in each case 3 scenarios with corresponding names (Boarding, Taxi, Landing, Cruise, . . . ), as illustrated in FIG. 1. The three light scenarios 18 in the group MAINT. are not shown for the sake of clarity. The light scenarios 18 differ, inter alia, in terms of brightness and colour shade, wherein within a scenario different lamps 12 partially produce light of different colour shades.

The operating unit 14 is therefore also after the upgrade what is known as a "discrete control classic cabin".

Controlling the illumination arrangement 6 for selecting and activating the corresponding light scenarios 18 is effected, as before, by transmitting control signals 20 to the lamp arrangement 10 via the control line 8. The control signals 20 are produced upon operating the operating keys 16*a-d* and applied to the control line 8. Each of the operating keys 16*a-d* is here assigned its own control signal 20. In the example, the control line 8 has two cores 22*a,b*. The control signals 20 are a respective binary coding of the cores 22*a,b* in the form of logical binary values of "00", "01", "10" and "11". Consequently, each of the operating keys 16*a,b* is assigned its own binary coding of the cores 22*a,b*.

The lamp arrangement 10, or in the present case each of the lamps 12, contains a first decoder 24, which is illustrated here representatively for only one of the lamps 12. The first decoder 24 assigns one of the prescribed above-mentioned light scenarios 18 that are to be produced by the lamp arrangement 10 to a respective specific sequence 50 of control signals 20 which are received in succession. The first decoder 24 to this end contains a decoding instruction 26, which has a menu structure. The menu structure has, as menu elements 28, four "pages", which correspond to the above-mentioned groups. Each page contains, as further menu elements 28, three light scenarios 18 for selection. It is possible to switch between the pages and within the pages by way of navigation steps. Light scenarios can be selected by selection steps. The navigation and selection of respective menu elements 28 is effected by the control signals 20, which will be explained in more detail below.

The illumination arrangement 6 additionally contains an add-on display 30, which is likewise connected to the control line 8 in order to likewise receive the control signals 20 (indicated in FIG. 1 by way of an arrow). The additional display 30 contains a second decoder 32. The second decoder 32 contains the decoding instruction 26 and consequently the same menu structure and allocates to a respective received control signal a graphic representation 34 of the menu element 28 which is respectively currently selected by said control signal 20. The graphic representation 34, which is currently recognized in each case on the basis of the currently received control signal 20, is displayed on the add-on display 30.

As part of the above-mentioned retrofit, the operating keys 16*a-d* were assigned new functionalities for operating the menu structure, which is why the original function designation has been made unrecognizable by the application of an adhesive strip 36. Attached in addition below the operating keys 16*a-d* was an additional sticker 38 describing the new meaning of the operating keys 16*a-d*, specifically in this case the respective selection and operation of the menu pages GROUND, FLIGHT, NIGHT and MAINT. etc. Adhesive strips 36 or additional stickers 38 are also referred to as "add-on placard".

In accordance with FIG. 1, this results in an exemplary operating sequence as follows:

During at least one elapsed time-out period tTO of in the present case 10 seconds, none of the operating keys 16 *a-d* was pushed. The lamp arrangement 10 currently produces the light scenario 18 "Bluesky", which is why the word "Bluesky" is displayed in the representation 34 (not shown) on the add-on display 30 as a plain text identifier for the currently activated light scenario 18 (that is to say corresponding to representation 34*f*, see below, except for "Bluesky" instead of "Sunrise").

An operator in the form of a member of the cabin crew now wishes to change the light scenario 18 to "Sunrise". First, said operator operates the operating key 16*a* "GROUND" and in this way advances to the menu element 28 in the form of the first selection page "GROUND", the graphic representation 34*a* of which is displayed on the add-on display 30. FIG. 1 shows at the bottom successively from left to right the respective graphic representations 34 on the add-on display 30.

Since the desired light scenario 18 "Sunrise" is not listed here, the operator operates the operating key 16*b* and in this way reaches the second selection page "FLIGHT" as the new menu element 28. This page is also displayed on the add-on display 30 as the representation 34*b*, and the desired light scenario 18 is not listed here either. Finally, the operator operates the operating key 16*c* and reaches as the new menu element 28 the third selection page "NIGHT", which is displayed on the add-on display 30 in accordance with its representation 34*c*. The desired light scenario 18 is available here.

On each of the selection pages, in each case the uppermost light scenario ("1.") has a marker 35, in the present case a selection tick, that is to say the light scenario 18 "Sunset" in the selection page "NIGHT". Since this is not yet the desired light scenario 18, another push of the operating key 16*c* is effected; in this way, the marker 35 travels from "Sunset" to the light scenario 18 "Bluesky" as the next menu element 28 with representation 34*d* (in dashed lines) on the add-on display 30. With a further push of the operating key 16*c*, the marker 35, once again illustrated in dashed lines, is placed at the desired light scenario 18 "Sunrise". This menu element 28 is also displayed on the add-on display 30 in accordance with the representation 34*e*. By waiting out the period tTO of 10 seconds (indicated by a dashed arrow), the light scenario 18 "Sunrise" is then activated, which is why a further menu element 28 is reached, specifically the actual output of the light scenario 18 "Sunrise" by the lamp arrangement 10. The corresponding representation 34*f* is the screen-filling representation of the word "Sunrise" on the add-on display 30.

To cancel the selection, the operator could also have pushed the operating key 16*c* a second time, without waiting out the time-out tTO. The marker 35 would then have disappeared completely from the represented page "NIGHT", i.e. none of the light scenarios 18 there would have been selected. After waiting out the time period tTO, the light scenario 18 "Bluesky" would have stayed unchanged, and the representation 34 of the corresponding menu element 28 would then once again have been the screen-filling representation of the word "Bluesky" (according to representation 34*f*).

The lamp arrangement 10 likewise evaluates the order of the operating of the operating keys 16*a-c* and consequently the sequence 50 of the control signals 20 (here in accordance with the original key designations NIGHT,DIM1,DIM2, BRT,BRT,BRT) and waiting out the time period tTO in accordance with the menu structure, which is likewise implemented in the two decoders 24, 32. In this way, the lamp arrangement 10 also arrives at the output of the light scenario 10 "Bluesky".

The menu elements 28, which effect a screen-filling representation (e.g. 34*f*) of the name of the light scenario 18, are also referred to as "current scene display". The control line 8 forms what is known as a "discrete interface" between operating unit 14 and lamp arrangement 10, the connection of the add-on display 30 to the control line 8 forms a "monitoring interface", which is connected to the control line 8 in a merely "listening" fashion. That is to say that control signals 20 are transmitted only in the direction from the control line 8 to the add-on display 30, indicated by the above-mentioned arrow.

FIG. 2 shows the aircraft 2 having the passenger cabin 4 from FIG. 1 (in simplified representation with the omission of many details which have the same design as in FIG. 1, which also applies to FIGS. 3 and 4) with an alternative illumination arrangement 6. The latter differs from that from FIG. 1 substantially in that, during the upgrade/retrofit, the operating key 16a maintains its function unchanged, and only the operating keys 16b-d were assigned new and different functionalities PAGE, DOWN, SCENE. The menu structure in the decoders 24, 32 is therefore likewise changed. Adhesive strips 36 are therefore only applied to the operating keys 16b-d, and the additional sticker 38 is correspondingly adapted.

The starting point for an example of operation is, as in FIG. 1, a currently activated light scenario 18 "Bluesky". The representations 34 displayed on the add-on display 30 after operating of operating keys 16c-d are once again shown in the bottom portion of FIG. 2.

After a first push of the operating key 16b (in each case illustrated by way of a dashed arrow), the operator arrives at the first (1.) menu element 28 in the form of the first selection page "GROUND" (representation 34a), after a second push of the operating key 16b at the second selection page "FLIGHT" (representation 34b) and with a further push of the operating key 16b at the third selection page "NIGHT". The marker 35 is here again always placed on the selection page that corresponds to the respectively first light scenario 18, in the present case at "Sunset" (not illustrated here). With a subsequent double push of the operating key 16c (indicated by a dashed arrow), the marker 35 is shifted via "Bluesky" (not illustrated) to "Sunrise" (representation 34c). By operating the operating key 16d, the desired light scenario 18 "Sunrise" is activated and immediately output by the lamp arrangement 10. This gives the representation 34d.

To cancel the input, the operator would only need to wait out the time period tTO, in the present case again 10 seconds, at any place. In that case, the currently activated light scenario 18 "Bluesky" would be kept unchanged.

FIG. 3 shows, in accordance with FIG. 2, an alternatively changed reconfiguration of the operating unit 14 during the upgrade/retrofit. Here, the operating keys 16a,b retain their original functionalities, and only the operating keys 16c,d are assigned new functions NEXT and SELECT. Once again, adhesive strips 36 and additional stickers 38 are correspondingly adapted.

From the same starting situation as in FIGS. 1 and 2, the operator here reaches, by pushing the operating key 16c three times, via the selection pages or menu elements 28 "GROUND" (representation 34a) and "FLIGHT" (representation 34b) "NIGHT" (representation 34b). None of the pages in this case has a marker 35. By pushing the operating key 16d, the operator selects here the selection page "NIGHT", or "holds on to it". The marker 35 is here set to the first light scenario 18 "Sunset" (illustrated in dashed lines). By pushing the operating key 16c twice, the marker 35 is shifted via "Bluesky" to "Sunset" (illustrated in dashed lines). By pushing the operating key 16d, the highlighted light scenario 18 "Sunset" is now selected and immediately activated.

To cancel the input, the operator only needs to wait out the time period tTO, in the present case again 10 seconds, at any place, as in accordance with FIG. 2. In that case, the currently activated light scenario 18 "Bluesky" remains unchanged.

In the embodiment in accordance with FIG. 4, the illumination arrangement 6, here the add-on display 30, additionally contains an input unit 40, which is operable by an operator and via which, in accordance with the same menu structure as in the previous examples, a desired light scenario 18 is selectable. The input unit 40 is a touch unit 42 on the add-on display 30 (which is why the input unit 40 is indicated only in dashed lines), i.e. the add-on display 30 is in the form of a touch display. However, the input by way of the operator is as follows: by way of a 3-part swiping movement 44, which in FIG. 4 is directed in each case to the left, on the add-on display 30 (indicated in FIG. 4 at the representations 34 by way of arrows), the operator passes via the selection pages "GROUND" (representation 34a) and "FLIGHT" (representation 34b) to the selection page "NIGHT" (not illustrated). Markers 35 are not shown here in each case. By way of a tap movement 46 (likewise indicated as an arrow), the operator directly selects the light scenario 18 "Sunrise" (representation 34c), which is thereby immediately activated (indicated by a dashed arrow).

To cancel the input, the operator only needs to wait out the time-out period tTO, in the present case again 10 seconds, at any place, as in accordance with FIGS. 2 and 3. In that case, the currently activated light scenario 18 "Bluesky" remains unchanged.

The actuation of the lamp arrangement 10 for representing the activated light scenario 18 "Sunrise" is here effected in accordance with the sequence 50 of control commands 20 in accordance with the operating scheme as in FIG. 3.

The illumination arrangement 6 to this end contains a coding unit 48. The latter produces the sequence 50, explained with respect to FIG. 3, of control signals 20, which sequence would be produced from the corresponding real operation of the operating keys 16c,d to correspondingly navigate the menu structure. However, since in accordance with FIG. 4 the corresponding operating keys 16c,d are not pushed in reality, the sequence 50 represents a series of virtual key pushes. In FIG. 4, the corresponding keys in the sequence 50 are designated with the original names of the operating keys 16c,d (DIM2, BRT) before the upgrade/retrofit.

The illumination arrangement 6, here likewise the add-on display 30, also contains a sequencing unit 52, which finally applies the sequence 50 of control signals 20 according to the virtual key pushes to the control line 8. The lamp arrangement 10 thus receives, via the control line 8, identically to the example in accordance with FIG. 3, the corresponding sequence 50 of control signals 20 and hereby produces light in accordance with the light scenario 18 "Sunrise".

In FIG. 4, for this reason the monitoring interface between add-on display 30 and control line 8 is a bidirectional interface, indicated by a double-headed arrow.

LIST OF REFERENCE SIGNS 2 passenger aircraft
4 passenger cabin
6 illumination arrangement
8 control line
10 lamp arrangement
12 lamp
14 operating unit
16a-d operating element/operating key
18 light scenario
20 control signal
22a,b core
24 first decoder
26 decoding instruction 28 menu element
30 add-on display
32 second decoder
34 representation
35 marker
36 adhesive strip
38 additional sticker
40 input unit
42 touch unit
44 swiping movement
46 tap movement
48 coding unit
50 sequence
52 sequencing unit
tTO time period

The invention claimed is:

1. A Passenger cabin for a passenger aircraft, having an illumination arrangement for the passenger cabin, wherein the illumination arrangement contains:

a control line, a lamp arrangement connected to the control line, and an operating unit, connected to the control line, having at least two operating elements for selecting prescribed light scenarios to be produced by the lamp arrangement by transmitting control signals from the operating unit to the lamp arrangement via the control line, wherein each of the operating elements is assigned its own control signal, wherein the lamp arrangement contains a first decoder, according to which a prescribed respective one of the light scenarios that are to be produced by the lamp arrangement (is assigned to a respective specific sequence of control signals which are received in succession, and wherein the first decoder has a decoding instructionin a menu structure, wherein the selection of menu elements of the menu structure is effected by way of the control signals, the illumination arrangement contains an add-on display, which is connected to the control line, wherein the add-on display contains a second decoder having the same decoding instruction, according to which a respectively received control signal is assigned a graphic representation of the menu element that is in each case currently selected by the control signals, wherein the graphic representation which is in each case currently recognized is displayed on the add-on display.

2. The passenger cabin according to claim 1, and wherein at least one of the representations contains a plain text identifier for at least one of the light scenarios.

3. The passenger cabin according to claim 1, wherein the control line has two or three cores.

4. The passenger cabin according to claim 3, wherein each of the operating elements is allocated its own binary coding of the cores.

5. The passenger cabin according to claim 1, wherein the control signal is a digital control signal with a minimum pulse duration of 100 ms.

6. The passenger cabin according to claim 1, wherein the operating unit contains at most six operating elements.

7. The passenger cabin according to claim 1, wherein the decoding instruction is designed for two or three or four of the operating elements.

8. The passenger cabin according to claim 7, wherein allocated to the two operating keys are the functions "NEXT" and "SELECT", or to the three operating keys the functions "PAGE", "DOWN" and "SCENE", or to the four operating keys the functions "GROUND", "FLIGHT", "NIGHT" and "MAINT.".

9. The passenger cabin according to claim 1, wherein the illumination arrangement contains:

an input unit, via which a desired light scenario is selectable in accordance with the menu structure, a coding unit, via which the respective sequence of control signals is assigned to the selected light scenario in accordance with the inverse decoding instruction, a sequencing unit, which is set up to transmit the respective sequence of the control signals to the illumination arrangement via the control line.

10. The passenger cabin according to claim 9, the add-on display is part of a touch display, and the input unit is a touch unit of the touch display.

* * * * *